US006956347B2

(12) United States Patent
Nihei et al.

(10) Patent No.: US 6,956,347 B2
(45) Date of Patent: Oct. 18, 2005

(54) ROBOT WITH SENSOR

(75) Inventors: Ryo Nihei, Fujiyoshida (JP); Satoshi Kinoshita, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/686,588

(22) Filed: Oct. 17, 2003

(65) Prior Publication Data

US 2004/0080294 A1 Apr. 29, 2004

(30) Foreign Application Priority Data

Oct. 24, 2002 (JP) ............................ 2002/309552

(51) Int. Cl.$^{7}$ ................................................ B25J 19/02
(52) U.S. Cl. .................................... 318/568.16; 901/46
(58) Field of Search ...................... 318/568.11, 568.16; 901/46, 47, 36, 38

(56) References Cited

U.S. PATENT DOCUMENTS 4,492,847 A 1/1985 Masaki et al.
4,575,304 A * 3/1986 Nakagawa et al. ......... 414/730
5,439,328 A 8/1995 Haggerty et al.
5,520,062 A 5/1996 Watanabe et al.
6,060,853 A 5/2000 Rongo et al.

FOREIGN PATENT DOCUMENTS

EP 0 341 968 A2 11/1989
EP 0 341 968 A3 11/1989
EP 0 884 141 A1 12/1998
JP 59-20965 2/1984

* cited by examiner

*Primary Examiner*—Bentsu Ro
(74) *Attorney, Agent, or Firm*—Staas & Halsey LLP

(57) ABSTRACT

A visual sensor main body is attached to a first attachment provided in a vicinity of a hand provided to a tip end of a robot arm to take an image of a workpiece to obtain a position and an attitude of the workpiece. Based on the detected position and attitude, the workpiece is grasped with the hand. The sensor main body is handed to the second attachment provided in the retreat position. Then, after mounting the grasped workpiece to a chuck of a working machine and machining the workpiece, the workpiece is taken out with the hand.

9 Claims, 7 Drawing Sheets

ROBOT WITH SENSOR

BACKGROUND OF THE INVENTION

1. Field of the Invention

The present invention relates to a robot with sensor means such as a visual sensor and a force sensor.

2. Description of the Related Art

During handling work carried out by a robot, a position and orientation of a part before positioning are detected by a visual sensor, a position and an attitude of a hand mounted to a tip end of a robot arm is controlled according to the detected position and attitude of the part, and the part is grasped, taken out, and sent to a next step. During work of assembling parts while controlling a pressing force of an end effector mounted to the robot, the feedback control of the force is carried out while detecting the force with the force sensor or the like.

When such sensor means is used and operation of the robot is controlled by using an output of the sensor means, the sensor means is normally disposed as close as possible to working means at the arm tip end, e.g., near the robot hand or a tool. A purpose of this is to enhance accuracy of sensing by extending a range in which the sensor means can sense and by allowing the sensor means to approach as close as possible to an object to be sensed.

FIG. 8 shows an example of a prior-art system for attaching and detaching a workpiece to and from a working machine by a robot by using a visual sensor. Positions and attitudes of the workpieces 104 to be fed to the working machine 101 are not fixed and the workpieces 104 are fed in random positions and attitudes. To an arm tip end of a robot 100, a hand 102 for grasping the workpiece and a visual sensor 103 for taking an image of the workpiece are mounted.

First, the arm tip end of the robot 100 is moved to a position of a work feeding portion, an image of the workpiece 104 to be fed is taken by the visual sensor 103 to obtain a position and an attitude of the workpiece, the workpiece 104 whose position and attitude have been obtained is grasped and taken out by the hand 102, and the workpiece 104 is set to a chuck 106 of the working machine 101.

Then, the robot 100 causes the arm tip end to retreat from a machining area of the working machine 101. The working machine 101 closes its door and machines the workpiece 104 inside itself. After the machining is completed, the robot 100 grasps and takes out the machined workpiece 104 and places the workpieces 104 in lines in a machined workpiece taking out position 105.

The above work is carried out. As described above, the sensor means is disposed at the tip end portion of the robot arm, the end effector such as the hand for carrying out work is attached to the robot tip end portion, and the sensor means enters an environment of work carried out by the end effector and a nearby work environment which the end effector approaches.

The sensor means such as the visual sensor is normally disposed at the arm tip end. Therefore, depending on work carried out by the robot, there are possibilities that the sensor means is exposed to an environment in which the sensor means is liable to be splashed with dust, cuttings, water, cutting fluid, a solvent, and the like or that the sensor means receives vibrations and shocks from a working tool. In the system example in FIG. 8 and described above, when the workpiece 104 is attached to the chuck 106 of the working machine 101 or when the workpiece 104 after machining is detached from the chuck 106, the hand 102 at the tip end of the robot arm enters the workpiece machining area and the visual sensor 103 also enters the machining area together with the hand 102. Large amounts of cuttings and cutting fluid are splashed in the machining area and these suspended cuttings and cutting fluid adhere to the visual sensor 103. This becomes a cause of hindrance to normal sensing and stable operation. As a result, depending on a use environment, use of the sensor means has to be given up or there is a necessity to take measures to frequently clean the sensor means.

Although sensor means of a type for detecting an external force and outputting a signal, i.e., the so-called force sensor is less liable to be affected by dust and liquid, detection accuracy is deteriorated and mechanical and electrical lives are shortened due to reception of vibrations and shocks.

SUMMARY OF THE INVENTION

According to a first form of the present invention, there is provided a robot with a sensor, which comprises sensor means and sensor disposal position changing means for changing a disposal position of the sensor means from one position to another, wherein a plurality of positions including positions at and around a robot arm are set in advance as positions where the sensor means is disposed.

According to a second form of the invention, there is provided a robot with a sensor, which comprises sensor means and sensor disposal position changing means for changing a disposal position of the sensor means from one position to another, where a plurality of positions are set in advance on a robot arm as positions where the sensor means is disposed.

Furthermore, the robot with the sensor according to the invention may be in the following forms for carrying out the invention.

One of the plurality of sensor means disposal positions is provided in an acting position where the sensor means is used while mounted to a tip end of the robot arm and another is provided in a retreat position where the sensor means retreats from the acting position when not used. The acting position of the sensor means is near working means mounted to the tip end of the robot arm and the retreat position is on the robot arm.

Protecting means for the sensor means or cleaning means for the sensor means is provided in the retreat position.

The sensor means is a visual sensor having a camera for taking a two-dimensional image, a measuring sensor for carrying out a three-dimensional measurement by using laser light, or a force sensor for outputting a signal according to an external force.

The sensor disposal position changing means is formed of retaining means for retaining the sensor means provided in each the disposal position and software in which a setting for controlling operation for handing the sensor means from one of the retaining means to another and carried out by the robot on its own is stored.

The sensor disposal position changing means is formed of driving means provided to an arm having a wrist at its tip end to drive the sensor means forward and backward to a working position and a retreat position, working means of the robot being mounted to the wrist.

The robot with the sensor according to the invention is protected from an environment which adversely affects the sensor.

DESCRIPTION OF THE EMBODIMENTS

Figure 1:
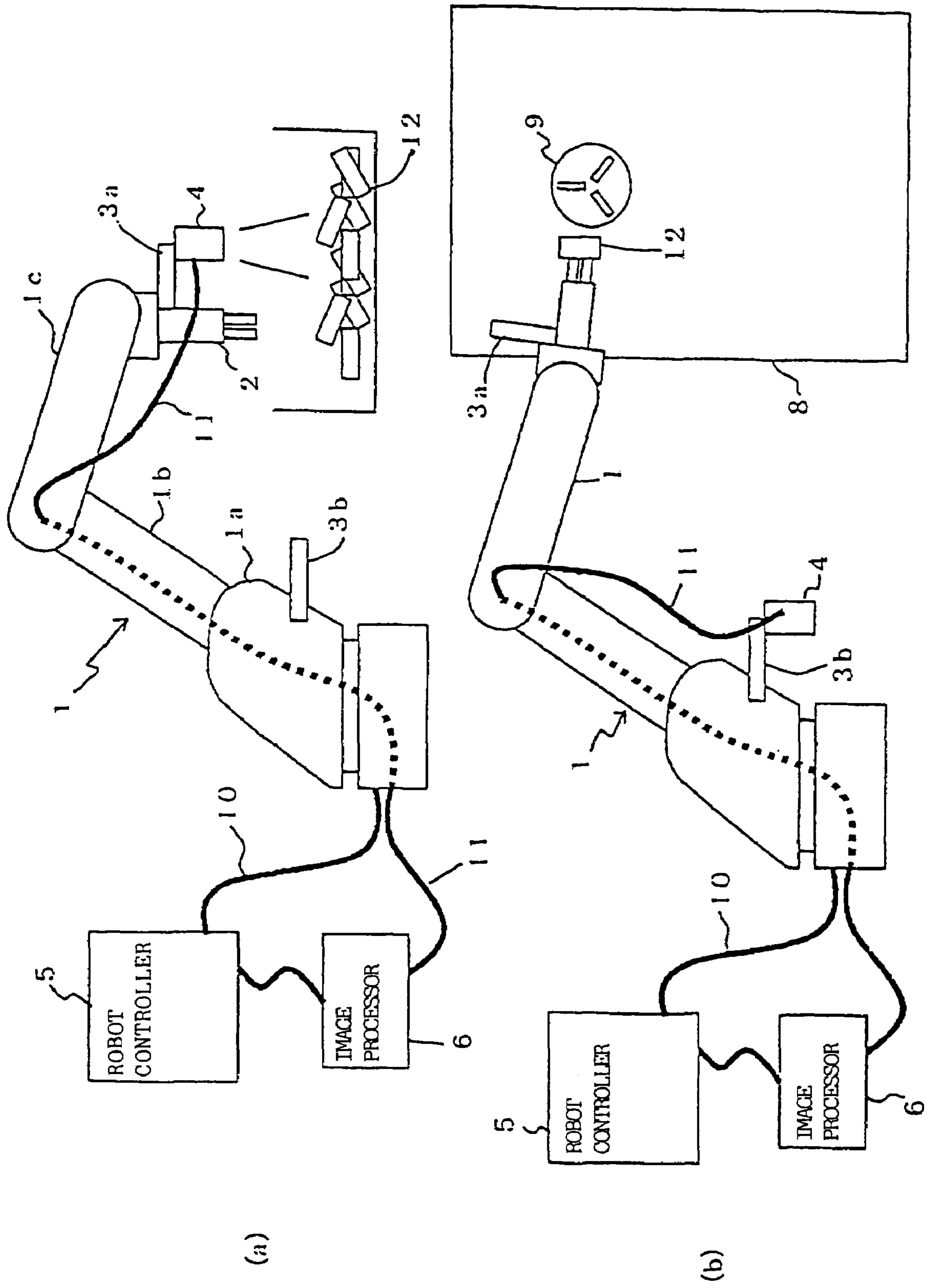
FIGS. 1(*a*) and 1(*b*) are schematic and operational explanatory views of an embodiment in which the present invention is applied to a robot having a visual sensor as sensor means.

FIGS. 1(*a*) and 1(*b*) are schematic diagrams of an embodiment in which the present invention is applied to a robot having a visual sensor as sensor means. FIG. 1(*a*) shows a state of disposition when the visual sensor is used and FIG. 1(*b*) shows a state of disposition when the visual sensor retreats to a retreat position. To a tip end of a robot arm 1, a hand 2 for grasping a part is mounted as working means. In a vicinity of the hand 2, a first attachment 3*a* for attaching a sensor main body 4 (a camera or the like of the visual sensor) is disposed. A position of the first attachment 3*a* corresponds to an acting position where the visual sensor as sensor means operates and acts. With the sensor main body 4 attached in this position, the robot arm 1 carries out sensing of a workpiece 12 such as a part to be handled by the robot arm 1.

A second attachment 3*b* having the same structure as the first attachment 3*a* is mounted to and disposed at a rotary body 1*a* of the robot arm 1 as shown in FIG. 1(*b*). FIG. 1(*b*) in which this disposal position is the retreat position for the sensor means shows a state in which the sensor main body 4 is disposed in the retreat position.

The robot arm 1 and a robot controller 5 for controlling the robot are connected by a cable 10. The cable 10 passes through the rotary body 1*a*, a lower arm 1*b*, and an upper arm 1*c* forming the robot arm 1 and is connected to a servomotor for driving each shaft of the robot, a driving source of the hand 2, and sensor fixing cylinders 32 of the first and second attachments 3*a* and 3*b* and which will be described later.

An image processor 6 is connected to the robot controller 5 and the image processor 6 and the sensor main body 4 of the visual sensor or the like are connected by a cable 11. The cable 11 passes through the robot arm 1, is drawn outside from a midpoint of the upper arm 1*c*, and is connected to the sensor main body 4. The robot controller 5 has the same structure as a prior-art robot controller and includes a processor, a memory, an axis control circuit for controlling the servomotor for each the axis of the robot arm 1, an input/output interface connected to peripheral devices such as the first and second attachments 3*a* and 3*b*, and the like. The image processor 6 is also similar to a prior-art image processor and obtains a position and an attitude of the workpiece 12 from images taken by a camera or the like of the sensor main body 4.

The first attachment 3*a* and the second attachment 3*b* have substantially the same structures. Here, a structure of the second attachment 3*b* and attachment and detachment of the sensor main body 4 to and from the second attachment 3*b* will be described.

The second attachment 3*b* is formed of a bracket 31, a sensor fixing cylinder 32, and a positioning pin 33. On the other hand, a sensor mounting member 41 extending on opposite sides is fixed onto the sensor main body 4. At opposite end portions of the sensor mounting member 41, a firs hole 42*a* to be engaged with a pin 33 of the first attachment 3*a* and a second hole 42*b* to be engaged with a pin 33 of the second attachment 3*b* are formed.

Figure 3:
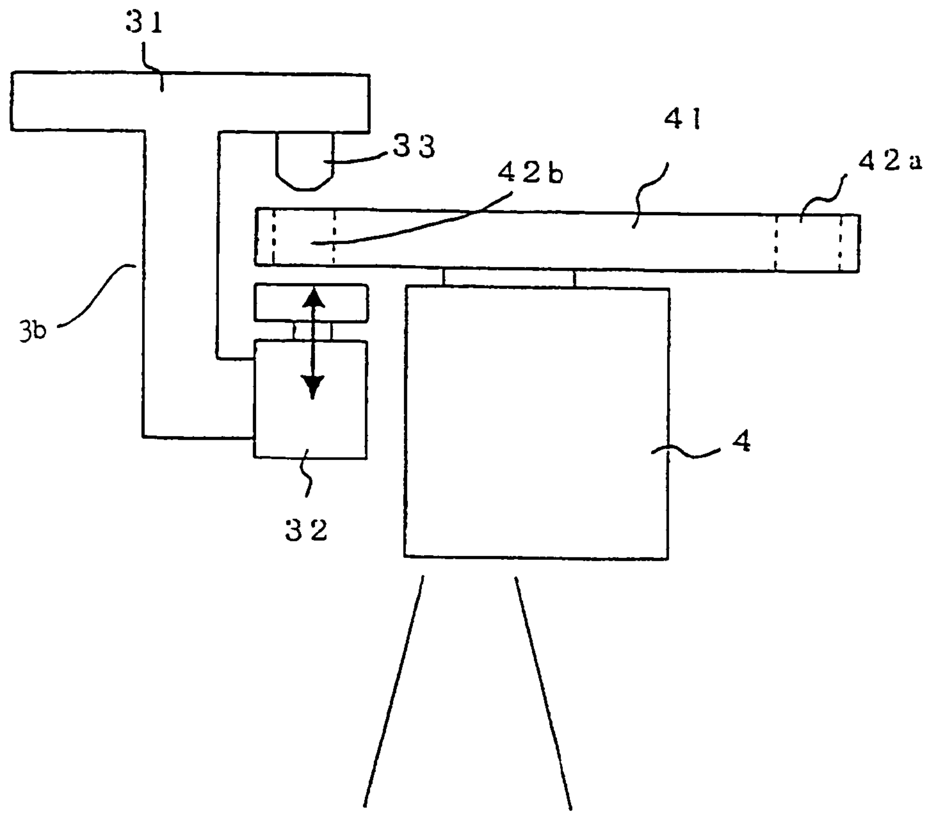
FIG. 3 is an explanatory view of structures of first and second attachments respectively used in the embodiments in FIGS. 1 and 2 and attachment and detachment of a sensor main body to and from each the attachment.

As shown in FIG. 3, by engaging the positioning pin 33 of the second attachment 3*b* in the second hole 42*b* of the sensor mounting member 41 and sandwiching the sensor mounting member 41 between the sensor fixing cylinder 32 and the bracket 31, the sensor main body 4 is fixed to the second attachment 3*b*.

As for the first attachment 3*a*, by engaging the positioning pin 33 of the first attachment 3*a* in the first hole 42*a* of the sensor mounting member 41 and sandwiching the sensor mounting member 41 between the sensor fixing cylinder 32 and the bracket 31, the sensor main body 4 is fixed to the first attachment 3*a*.

Then, the sensor main body 4 such as the camera is attached to the first attachment 3*a* mounted to a tip end of the robot arm and the robot is caused to operate. As shown in FIG. 1(*a*), after the sensor main body 4 is moved to an image pick-up position of the workpiece 12 before machining, the sensor main body 4 takes an image of the workpiece 12, the image processor 6 obtains the position and the attitude of the workpiece, the robot is driven based on the obtained position and attitude, and the workpiece 12 is grasped with the hand 2.

Next, after the tip end of the arm of the robot is moved to a position of the second attachment 3*b* and the second hole 42*b* of the sensor mounting member 41 and the positioning pin 33 of the second attachment 3*b* are engaged with each other, the sensor fixing cylinder 32 of the second attachment 3*b* is actuated to fix the sensor main body 4 to the second attachment 3*b*.

Then, actuation of the sensor fixing cylinder 32 of the first attachment 3*a* is cancelled, the robot is driven, the positioning pin 33 of the first attachment 3*a* and the first hole 42*a* are disengaged from each other, and the sensor main body 4 is detached from the tip end of the arm of the robot.

Then, as shown in FIG. 1(*b*), the tip end of the robot arm is moved to a workpiece mounting position of a working machine 8 and the workpiece 12 grasped with the hand 2 is mounted to a chuck 9 of the working machine 8.

Next, the tip end of the robot arm is caused to retreat from a machining area of the working machine 8 and the working machine 8 machines the workpiece 12. After the machining is completed, the machined workpiece 12 is grasped with the robot hand 2, detached from the chuck 9, moved to a predetermined placing space, and placed in the placing space.

Then, by operational processing similar to that described above, the sensor main body 4 is handed from the second attachment 3*b* to the first attachment 3*a* and is fixed by the first attachment 3*a* and an operation for obtaining a position and an attitude of the next workpiece 12 is carried out similarly to the above operation as shown in FIG. 1(*a*). Thereafter these operations are repeatedly executed.

In other words, the following operations are repeatedly executed: the sensor main body 4 attached to the first attachment 3*a* at the tip end of the robot arm is moved to the acting position of the sensor means; the image of the workpiece 12 is taken to detect the position and the attitude of the workpiece 12; the workpiece 12 is grasped; the tip end of the robot arm retreats and moved toward the second attachment 3*b*; the sensor main body 4 is handed to the second attachment 3*b*; the workpiece 12 is attached to the chuck 9 of the working machine 8; the arm tip end retreats from the machining area; the machined workpiece is taken out; the workpiece is placed in the placing space; and the sensor main body 4 is handed from the second attachment 3*b* to the first attachment 3*a*.

In the above-described operations, when the tip end of the robot arm enters the machining area of the working machine 8, the sensor main body 4 is retained by the second attachment 3*b* in the retreat position and is not retained by the tip end of the robot arm. Moreover, because the second attachment 3*b* is in the position at a distance from the machining area, cuttings and cutting fluid do not adhere to the sensor main body 4 even if the hand 2 enters the machining area of the working machine.

Although the second attachment 3*b* is provided to the robot arm 1 in the above-described embodiment, the position of the attachment 3*b* is not limited to this. By disposing the second attachment 3*b* outside an area in which surroundings of the working machine 8 are liable to be soiled due to machining operation and the like of the working machine 8 and in a range in which the robot arm 1 can operate, movement of the sensor main body 4 between the first and second attachments 3*a* and 3*b* can be carried out by operation of the robot arm 1.

Figure 2:
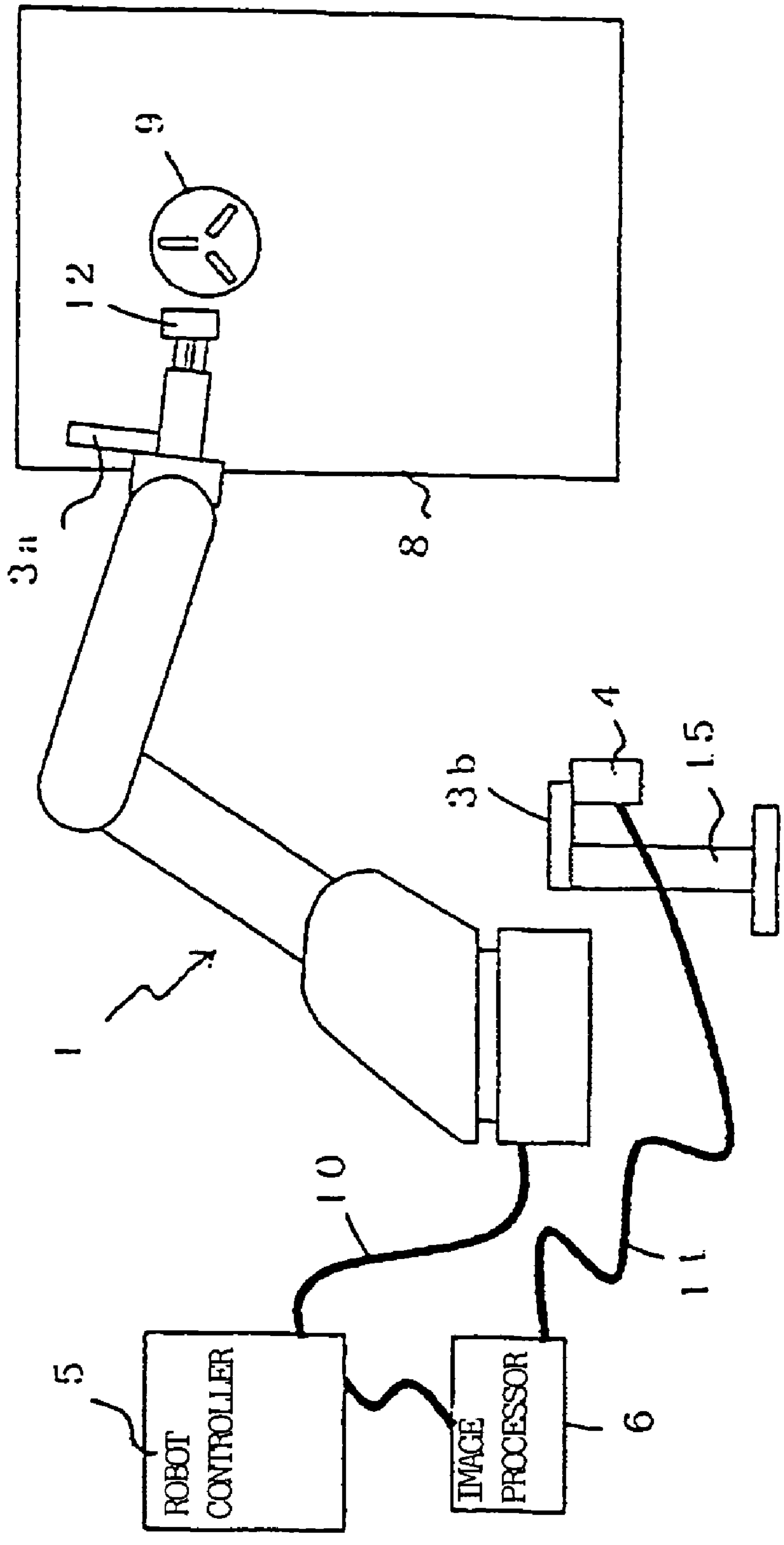
FIG. 2 is an explanatory view of another embodiment of the invention.

FIG. 2 is an explanatory view of another embodiment in which a position in a robot operating range, not affected by a working environment, is employed as a retreat position. A fixing stand 15 is provided on a floor, the second attachment 3*b* is mounted to the fixing stand 15, and this position is employed as the retreat position. This is a main difference between this embodiment and the embodiment shown in FIGS. 1(*a*) and 1(*b*). The example shown in FIG. 2 has merits in that the image processor 6 and the sensor main body 4 can directly be connected without passing the cable 11 for wiring for the sensor through the robot and wiring can easily be installed. However, it has a demerit in that the cable 11 trails along when the sensor main body 4 is attached to the first attachment 3*a* at the tip end of the robot arm in the position of the fixing stand 15. When the fixing stand 15 is provided, the cable 11 may be passed through the robot arm 1, taken out from the midpoint of the upper arm 1*c*, and connected to the sensor main body 4 as shown in FIGS. 1(*a*) and 1(*b*).

Figure 4:
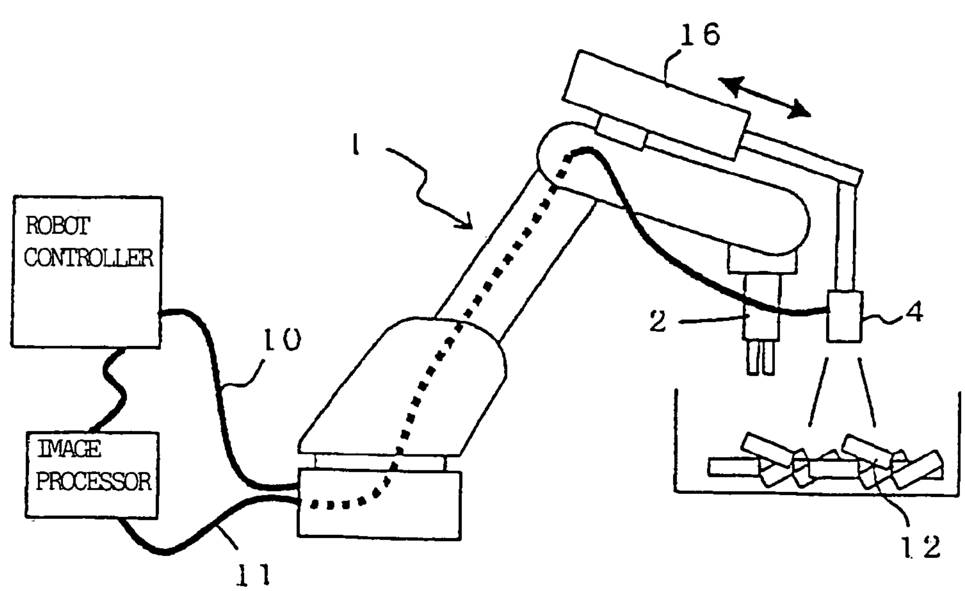
FIG. 4 is an explanatory view of yet another embodiment of the invention.

FIG. 4 is an explanatory view of yet another embodiment. Although means for changing the disposal position of the sensor main body 4 to the acting position and the retreat position is formed of software for driving the robot arm 1 and the robot in the embodiments shown in FIGS. 1(*a*), 1(*b*), and 2, the means for changing the disposal position of the sensor main body 4 is formed of driving means 16 such as a cylinder in another embodiment shown in FIG. 4.

In the embodiment shown in FIG. 4, a cylinder 16 as driving means is mounted to the upper arm 1*c* and the sensor main body 4 is moved forward and backward on a side of the upper arm 1*c* in parallel to an axis of the upper arm 1*c* by the cylinder 16 so that the sensor main body 4 can be disposed in the image pick-up position (acting position) shown in FIG. 4 and also in the retreat position on the side of the upper arm 1*c*. In the embodiment shown in FIG. 4, because the sensor main body 4 can be disposed by the cylinder 16 in the acting position and in the retreat position, it is essential only that the robot controller 5 and the cylinder 16 be connected to each other.

Although it is not shown in the drawings, even if the robot arm 1 runs, the sensor main body 4 moves together with the robot arm 1 and the disposal position of the sensor main body 4 can be changed quickly in the embodiments shown in FIGS. 1 and 4 because means for retaining the sensor main body 4 in the acting position and in the retreat position are provided to the robot arm 1.

Figure 5:
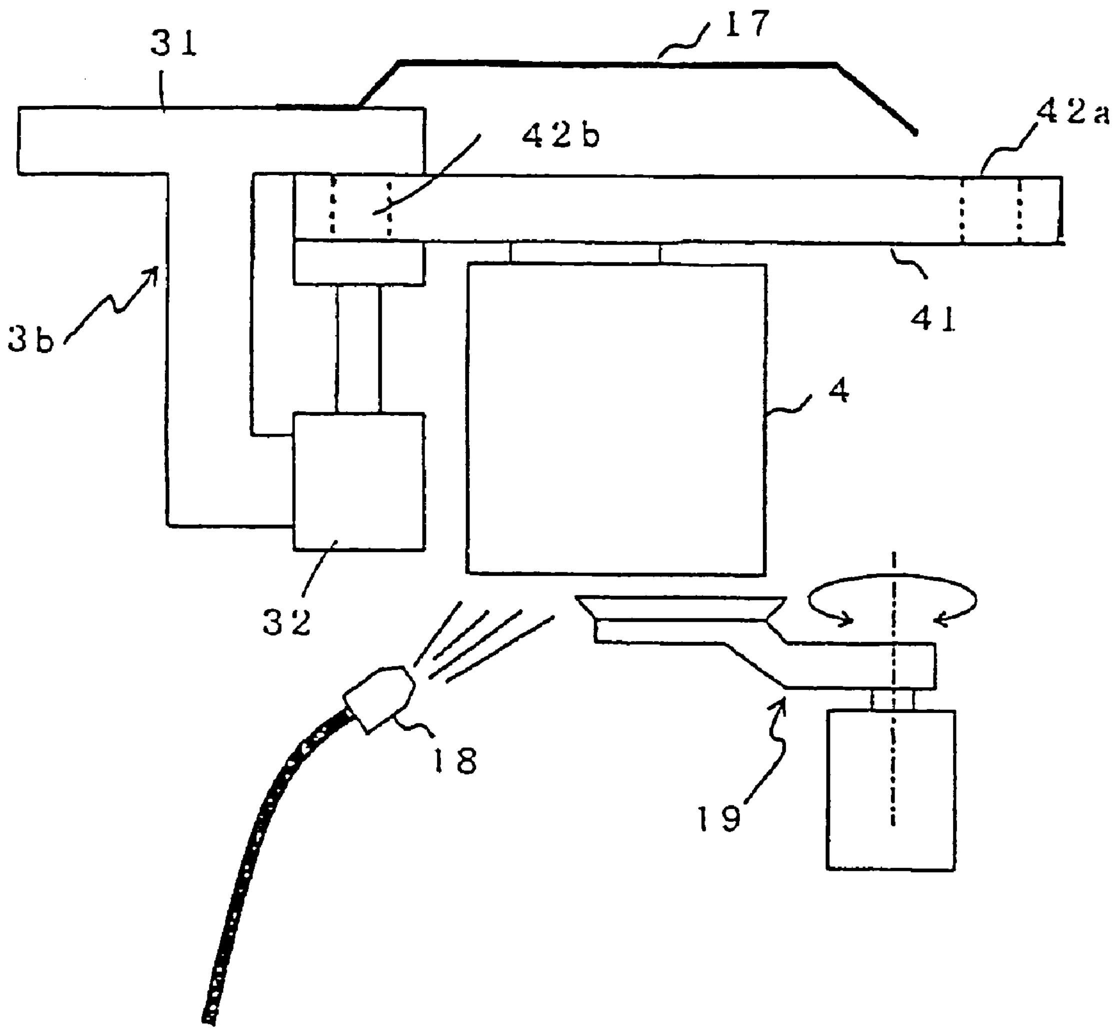
FIG. 5 is an explanatory view of an example in which protecting and cleaning means for an optical system are provided to the second attachment in a retreat position when the sensor means is a visual sensor.

FIG. 5 is an explanatory view of an example in which the second attachment 3*b* in the retreat position is provided with cover means and cleaning means so as to protect optical systems of a light-emitting portion and a light-receiving portion of the camera or the like of the sensor main body 4 when the sensor means is the visual sensor.

In this example, by disposing the protective cover 17 on an upper side of the sensor main body 4, the sensor is protected from pouring dust and splash when it is used with the working machine 8. As a result, the sensor main body (visual sensor) 4 becomes less liable to be soiled and a periodic maintenance cycle can be extended. Moreover, it is possible to prevent the peripheral devices from unintentionally coming in contact with the sensor main body to damage the sensor. As shown in FIG. 5, an air nozzle of air blowing means 18 may be disposed to face a light input/output face of the optical system of the light-receiving portion, the light-emitting portion, and the like of the sensor main body 4 which is the visual sensor to blow off the soil which has adhered to the face. Furthermore, not only the air blower using the air nozzle but also means for spraying wash water (not shown) and wiping means 19 using a wiper may be provided and cleaning may be carried out by wiping the sprayed wash water off with the wiping means 19 and drying with the air blower. As a result, it is possible to further extend the maintenance cycle and to make the sensor main body maintenance free.

Although the simple upper cover is shown in FIG. 5, it is possible to obtain further enhanced protecting effect by surrounding the sensor with a cover and providing an opening/closing door to the cover.

Figure 6:
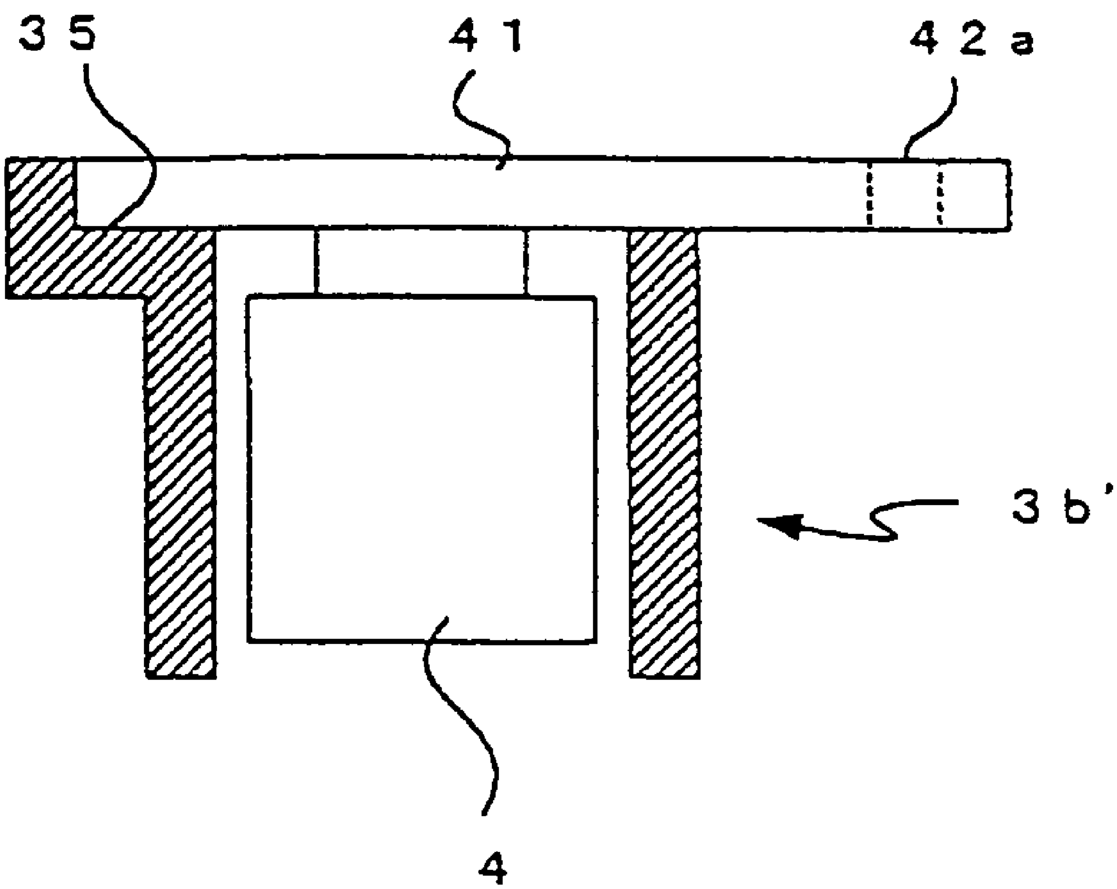
FIG. 6 is an explanatory view of another form of the second attachment disposed in the retreat position.

As shown in FIG. 6, a second attachment 3*b*' provided in the retreat position may be a tube or a member with a blind hole for housing the sensor main body 4. In a case of the second attachment 3*b*' in this embodiment, only one end portion of the sensor mounting member 41 is formed with the first hole 42*a* to be engaged with the positioning pin 33 for the first attachment and the second hole 42*b* need not be formed on the other end side. A recessed portion 35 to be engaged with the other end portion of the sensor mounting member 41 is formed in an upper end portion of the tube (or hole) for positioning of the sensor main body 4 in a placing position. Then, the sensor main body 4 attached to the first attachment 3*a* at the tip end of the robot arm is inserted into the tube or hole from above the second attachment 3*b*' and is placed on the second attachment 3*b*' by engaging the recessed portion 35 and the other end portion of the sensor mounting member 41 with each other. To take the sensor main body 4 out of the second attachment, the positioning pin 33 of the first attachment is inserted into the first hole 42*a* formed in the one end portion of the sensor mounting member 41, the sensor fixing cylinder 32 is actuated to sandwich the sensor mounting member, and the sensor main body 4 is fixed to the tip end of the robot arm and is pulled out of the tube of the second attachment 3*b*′.

Figure 7:
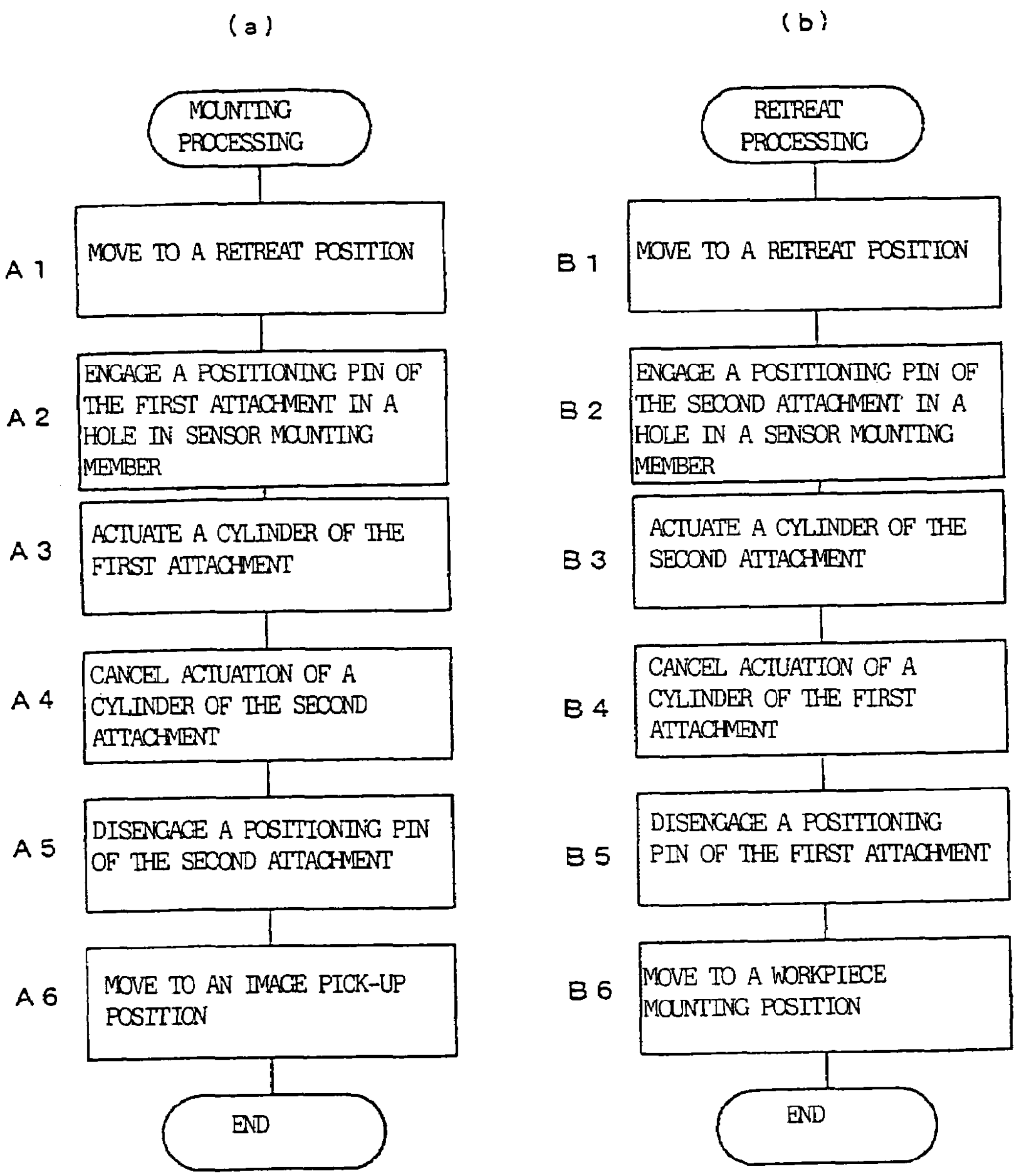
FIG. 7 is a flow chart of processing for handing the sensor main body in the first embodiment of the invention.
Figure 8:
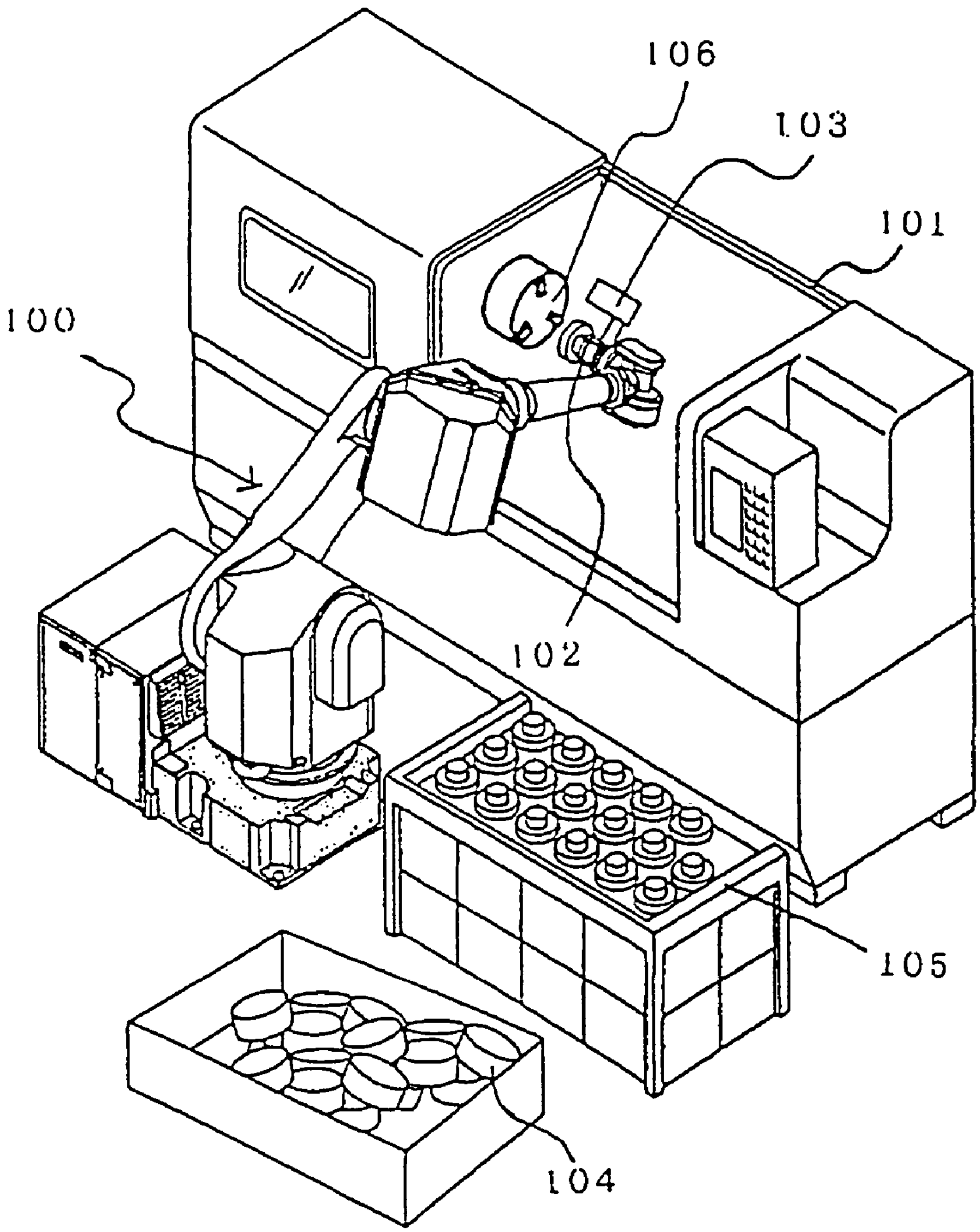
FIG. 8 is an explanatory view of a prior-art system in which a workpiece is attached and detached to and from a working machine by a robot by using a visual sensor.

FIGS. 7(*a*) and 7(*b*) are flow charts of processings for changing the disposal position of the sensor main body and carried out by the processor of the robot controller 5 in the embodiment shown in FIGS. 1(*a*) and 1(*b*). FIG. 7(*a*) shows operational processing for disposing the sensor main body 4 in the acting position, i.e., for attaching the sensor main body 4 to the first attachment 3*a* and FIG. 7(*b*) shows operational processing for disposing the sensor main body 4 in the retreat position, i.e., for attaching the sensor main body 4 to the second attachment 3*b*. It is possible to teach the operational processings to the robot as a part of a series of operational processing to be carried out by the robot. It is also possible that the operational processing for attaching and disposing the sensor main body in the acting position and the operational processing for disposing sensor main body in the retreat position are made subroutines and that the processings in FIGS. 7(*a*) and 7(*b*) are carried out by only programming a mounting command and a retreating command by a teach program.

To dispose the sensor main body 4 in the acting position, the sensor main body 4 is attached to the first attachment 3*a*. In this case, the processing in FIG. 7(*a*) is carried out. First, the tip end of the robot arm is moved to the retreat position and the positioning pin 33 of the first attachment 3*a* disposed at the arm tip end is opposed to the first hole 42*a* in the sensor mounting member 41 of the sensor main body 4 retained by the second attachment 3*b* (step A1). Then, the positioning pin 33 of the first attachment 3*a* is engaged in the first hole 42*a* of the sensor mounting member 41 (step A2).

Then, the sensor fixing cylinder 32 of the first attachment 3*a* is actuated and the sensor mounting member 41 is sandwiched between the bracket 31 of the first attachment 3*a* and the sensor fixing cylinder 32 to thereby fix the sensor main body 4 to the first attachment 3*a* (step A3). Then, actuation of the sensor fixing cylinder 32 of the second attachment 3*b* is cancelled (step A4), the tip end of the robot arm is moved, and the positioning pin 33 of the second attachment 3*b* and the second hole 42*b* in the sensor mounting member 41 are disengaged from each other (step A5). Next, the tip end of the robot arm is moved to the position where the image of the workpiece to be worked on is taken by the sensor main body 4 (step A6) and the processing for attaching and disposing the sensor main body 4 to the working position is completed.

After the image of the workpiece 12 is taken and the position and the attitude of the workpiece 12 are detected by the sensor main body 4 (visual sensor) and the workpiece 12 is grasped with the hand 2, the processing operation in FIG. 7(*b*) is started. The tip end of the robot arm is moved to the retreat position and the second hole 42*b* in the sensor mounting member 41 of the sensor main body 4 retained by the first attachment 3*a* disposed at the tip end of the robot arm is opposed to the positioning pin 33 of the second attachment 3*b* (step B1). Then, the positioning pin 33 of the second attachment 3*b* is engaged in the second hole 42*b* in the sensor mounting member 41 (step B2).

Then, the sensor fixing cylinder 32 of the second attachment 3*b* is actuated and the sensor mounting member 41 is sandwiched between the bracket 31 of the second attachment 3*b* and the sensor fixing cylinder 32 to fix the sensor main body 4 to the second attachment 3*b* (step B3). Then, actuation of the sensor fixing cylinder 32 of the first attachment 3*a* is cancelled (step B4), the tip end of the robot arm is moved, and the positioning pin 33 of the first attachment 3*a* and the first hole 42*a* in the sensor mounting member 41 are disengaged from each other (step B5). Next, the workpiece grasped with the hand 2 at the tip end of the robot arm is moved to the position where the workpiece is attached to the working machine 8 (step B6) and the retreat processing of the sensor main body is completed.

Although the example of the two-dimensional visual sensor as the sensor means has been described in the above embodiment, the sensor means may be a three-dimensional measuring sensor or a force sensor for detecting a load. Although there are one acting position and one retreat position where the sensor means is disposed in the above embodiment, it is also possible that there are a plurality of acting positions and a plurality of retreat positions.

Because the sensor means is moved close to the working means only when the sensor means is used and the sensor means retreats to a place where the sensor means is less liable to be affected by the working environment when not used, the sensor means is not exposed to the adverse working environment. Especially when the robot is used with the working machine, the robot is not affected by dust, liquid splashes, vibrations, and shocks and therefore the sensor means can be used to work of the robot to which the sensor means could not be applied conventionally. As a result, a range of uses for the robot having the sensor means is increased.

What is claimed is:

1. A robot with a sensor, the robot comprising:

sensor means; and sensor disposal position changing means to change a disposal position of the sensor means from one position to another, wherein:

a plurality of sensor means disposal positions, including positions at and around a robot arm, are set in advance as positions where the sensor means is disposed;

one of said plurality of sensor means disposal positions is an acting position where the sensor means is used while mounted to a tip end of the robot arm and another is a retreat position where the sensor means retreats from the acting position when not used;

the acting position of the sensor means is near working means mounted to the tip end of the robot arm and the retreat position is on the robot arm; and protecting means to protect said sensor means when said sensor means is in the retreat position.

2. A robot with a sensor according to claim 1, wherein the sensor means is a visual sensor having a camera for taking a two-dimensional image.

3. A robot with a sensor according to claim 1, wherein the sensor means is a measuring sensor for carrying out a three-dimensional measurement by using laser light.

4. A robot with a sensor according to claim 1, wherein the sensor means is a force sensor for outputting a signal according to an external force.

5. A robot with a sensor according to claim 1, wherein the sensor disposal position changing means is formed of retaining means for retaining the sensor means provided in each disposal position and stores software including instructions to control the operation of handing the sensor means from one of the retaining means to another, which is carried out by the robot on its own.

6. A robot with a sensor according to claim 1, wherein the sensor disposal position changing means is formed of driving means provided to an arm having a wrist at its tip end to drive the sensor means forward and backward to a working position and a retreat position, working means of the robot being mounted to the wrist.

7. A robot with a sensor, the robot comprising:

sensor means; and sensor disposal position changing means to change a disposal position of the sensor means from one position to another, wherein:

a plurality of sensor means disposal positions, including positions at and around a robot arm, are set in advance as positions where the sensor means is disposed;

one of said plurality of sensor means disposal positions is an acting position where the sensor means is used while mounted to a tip end of the robot arm and another is a retreat position where the sensor means retreats from the acting position when not used;

the acting position of the sensor means is near working means mounted to the tip end of the robot arm and the retreat position is on the robot arm; and cleaning means to clean said sensor means when said sensor means is in the retreat position.

8. A robot with a sensor, the robot comprising:

sensor means; and sensor disposal position changing means to change a disposal position of the sensor means from one position to another, wherein:

a plurality of sensor means disposal positions are set in advance as positions where the sensor means is disposed;

one of said plurality of sensor means disposal positions is an acting position where the sensor means is used while mounted to a tip end of the robot arm and another is a retreat position where the sensor means retreats from the acting position when not used;

the acting position of the sensor means is near working means mounted to the tip end of the robot arm and the retreat position is on the robot arm; and protecting means to protect said sensor means when said sensor means is in the retreat position.

9. A robot with a sensor, the robot comprising:

sensor means; and sensor disposal position changing means to change a disposal position of the sensor means from one position to another, wherein:

a plurality of sensor means disposal positions are set in advance as positions where the sensor means is disposed;

one of said plurality of sensor means disposal positions is an acting position where the sensor means is used while mounted to a tip end of the robot arm and another is a retreat position where the sensor means retreats from the acting position when not used;

the acting position of the sensor means is near working means mounted to the tip end of the robot arm and the retreat position is on the robot arm; and cleaning means to clean said sensor means when said sensor means is in the retreat position.

* * * * *